US010278102B2

(12) United States Patent
Shimojou et al.

(10) Patent No.: US 10,278,102 B2
(45) Date of Patent: Apr. 30, 2019

(54) GATEWAY CHANGE METHOD (71) Applicant: NTT DOCOMO, INC., Chiyoda-ku (JP)

(72) Inventors: Takuya Shimojou, Chiyoda-ku (JP); Masayoshi Shimizu, Chiyoda-ku (JP); Tomoki Shibahara, Chiyoda-ku (JP); Atsushi Minokuchi, Chiyoda-ku (JP); Srisakul Thakolsri, Munich (DE); Malla Reddy Sama, Munich (DE); Wolfgang Kiess, Munich (DE)

(73) Assignee: NTT DOCOMO, INC., Chiyoda-ku (JP)

( * ) Notice: Subject to any disclaimer, the term of this patent is extended or adjusted under 35 U.S.C. 154(b) by 5 days.

(21) Appl. No.: 15/554,343

(22) PCT Filed: Jan. 25, 2017

(86) PCT No.: PCT/JP2017/002527
§ 371 (c)(1),
(2) Date: Aug. 29, 2017

(87) PCT Pub. No.: WO2017/141648
PCT Pub. Date: Aug. 24, 2017

(65) Prior Publication Data
US 2018/0041931 A1 Feb. 8, 2018

(51) Int. Cl.
*H04W 4/00* (2018.01)
*H04W 36/08* (2009.01)
(Continued)

(52) U.S. Cl.
CPC ....... *H04W 36/08* (2013.01); *H04W 36/0055* (2013.01); *H04W 36/12* (2013.01);
(Continued)

(58) Field of Classification Search
CPC .................................................. H04W 36/08
See application file for complete search history.

(56) References Cited

U.S. PATENT DOCUMENTS

2009/0129342 A1\* 5/2009 Hwang ............. H04W 36/0022
370/331
2011/0075675 A1\* 3/2011 Koodli .................... H04L 12/14
370/401
(Continued)

OTHER PUBLICATIONS

International Search Report dated Mar. 28, 2017, in PCT/JP2017/002527 filed Jan. 25, 2017.
(Continued)

*Primary Examiner* — Gerald A Smarth
(74) *Attorney, Agent, or Firm* — Oblon, McClelland, Maier & Neustadt, L.L.P.

(57) ABSTRACT

A correspondence information storage 32 acquires correspondence information in which an eNB 20, an SGW-C 60, and an SGW-U 70 are associated with each other in advance, and a connection controller 31 receives a handover request from the eNB 20 and identifies a target eNB 20 and a source eNB 20. A connection changer 33 identifies the SGW-C 60 and the SGW-U 70 associated with the target eNB 20 and identifies the SGW-C 60 and the SGW-U 70 associated with the source eNB 20, with reference to the correspondence information. The connection changer 33 determines whether or not the SGW-C 60 and the SGW-U 70 are to be changed on the basis of the identified result, and controls change requests for at least one of the SGW-C 60 and the SGW-U 70 on the basis of a result of the determination.

4 Claims, 6 Drawing Sheets (51) Int. Cl.
*H04W 88/16* (2009.01)
*H04W 36/00* (2009.01)
*H04W 36/12* (2009.01)
*H04W 36/10* (2009.01)
*H04W 76/22* (2018.01)

(52) U.S. Cl.
CPC ............ *H04W 88/16* (2013.01); *H04W 36/10* (2013.01); *H04W 76/22* (2018.02)

(56) References Cited

U.S. PATENT DOCUMENTS

| | | | |
|---|---|---|---|
| 2011/0080890 A1* | 4/2011 | Cai .................. | H04W 36/0033 370/331 |
| 2014/0036776 A1* | 2/2014 | Al-Shalash .......... | H04W 40/22 370/328 |
| 2015/0117408 A1* | 4/2015 | Kedalagudde .... | H04W 36/0027 370/331 |

OTHER PUBLICATIONS

3GPP TS 23.401, V13.5.0, Technical Specification, "3rd Generation Partnership Project; Technical Specification Group Services and System Aspects: General Packet Radio Service (GPRS) enhancements for Evolved Universal Terrestrial Radio Access Network (E-UTRAN) access", (Release 13), (Dec. 2015), 337 pages.

English translation of the International Preliminary Report on Patentability and Written Opinion dated Aug. 30, 2018 in PCT/JP2017/002527.

* cited by examiner

| SGW-C | SGW-U | eNB |
|---|---|---|
| SGW-C 1 | SGW-U 1A | eNB1, eNB2, eNB3 |
|  | SGW-U 1B | eNB4, eNB5, eNB6 |
| SGW-C 2 | SGW-U 2A ... | eNB6, ... |

Fig. 5

Fig.6 ated with the source base station identified by the request reception step are identified, and the change requests for at least one of the first serving gateway and the second gateway is controlled. So, it is possible to more appropriately determine whether or not the change process for a serving gateway corresponding to a control plane and a serving gateway corresponding to a user plane is necessary, in contrast to a case in which the first serving gateway and the second serving gateway are uniformly changed in accordance with the change of the base station.

GATEWAY CHANGE METHOD

TECHNICAL FIELD

The present invention relates to a gateway change method.

BACKGROUND ART

Non-Patent Literature 1 discloses that conventionally, a mobility management entity (MME) is selected on the basis of a terminal type of user equipment (UE) required to be attached, and the selected MME selects a serving gateway (SGW) on the basis of load information of an SGW. In addition, Non-Patent Literature 1 also discloses that the SGW is changed in a case where a handover occurs.

CITATION LIST

Non-Patent Literature

[Non-Patent Literature 1] 3GPP TS 23.401

SUMMARY OF INVENTION

Technical Problem

Incidentally, in cases where a SGW corresponding to a control plane (C-Plane) and a SGW corresponding to a user plane (U-Plane) are separately selected, if both the SGWs are changed every time a handover occurs, a process load due to the change may apply. For this reason, in a case where a handover occurs, it is desirable to determine whether or not it is necessary to change both the SGWs.

Therefore, an object of the present invention is to provide a gateway change method which can appropriately determine whether or not a change process for the SGW corresponding to a control plane and the SGW corresponding to a user plane is necessary in a case where a handover occurs.

Solution to Problem

In order to solve the above problems, a gateway change method according to one embodiment of the present invention is a gateway change method which changes a serving gateway for a connection to a terminal in a communication system including the terminal, a plurality of base stations, a plurality of serving gateways, and a communication control device; the method including: an acquisition step of acquiring correspondence information in which the base station, a first serving gateway that transmits or receives a control signal using a control plane which is a path for transmitting the control signal for a communication service used by the terminal, and a second serving gateway that transmits or receives a user data signal using a user plane which is a path for transmitting the user data signal for the communication service are associated with each other; a request reception step of receiving a handover request and identifying a target base station and a source base station in the handover request; and a gateway change step of identifying a first serving gateway and a second serving gateway associated with the target base station identified by the request reception step and a first serving gateway and a second serving gateway associated with the source base station identified by the request reception step, with reference to the correspondence information acquired in the acquisition step, determining whether or not the first serving gateway is to be changed and the second gateway is to be changed on the basis of the identified result, and controlling change requests for at least one of the first serving gateway and the second gateway on the basis of a result of the determination.

According to the present invention, the first serving gateway and the second serving gateway associated with the target base station identified by the request reception step and the first serving gateway and the second serving gateway associated with the source base station identified by the request reception step are identified, and the change requests for at least one of the first serving gateway and the second gateway is controlled. So, it is possible to more appropriately determine whether or not the change process for a serving gateway corresponding to a control plane and a serving gateway corresponding to a user plane is necessary, in contrast to a case in which the first serving gateway and the second serving gateway are uniformly changed in accordance with the change of the base station.

In addition, in the gateway change method according to one embodiment of the present invention, in the gateway change step, in a case where the first serving gateway is not changed but the second serving gateway is changed, a change request only for the second serving gateway is made according to a result of the determination. In this case, a change process only for a serving gateway which should be changed is made, and thus it is possible to appropriately control the change request.

Moreover, in the gateway change method according to one embodiment of the present invention, in the gateway change step, connection destination information indicating a connection destination of the second serving gateway which is a change request target is acquired, the connection destination information is transmitted, and a change request for the second serving gateway is made. In this case, since the connection destination of the second serving gateway is acquired in advance and the connection destination is transmitted at a time of making a change request, it is possible to omit a process of acquiring a connection destination executed by a device at a change request destination.

Advantageous Effects of Invention

According to the present invention, it is possible to appropriately determine whether or not a change process for a SGW corresponding to a control plane and a SGW corresponding to a user plane is needed in a case where a handover has occurred.

DESCRIPTION OF EMBODIMENTS

Hereinafter, an embodiment of the present invention will be described in detail with reference to the accompanying drawings. In the description of the drawings, the same elements are denoted by the same reference numerals, and duplicated description thereof will be omitted.

Figure 1:
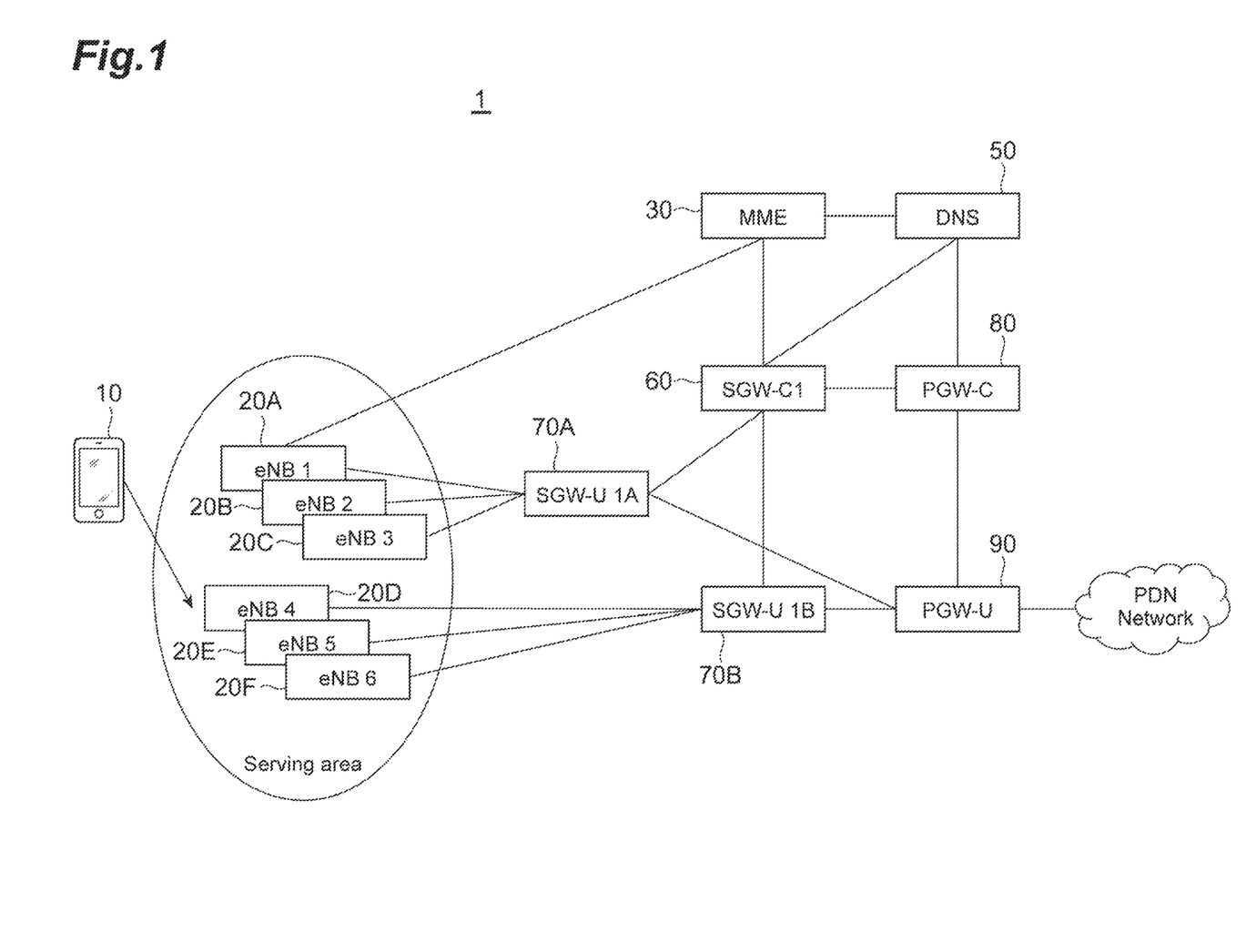
FIG. 1 is a diagram which shows a system configuration of a communication system according to an embodiment of the present invention.

FIG. 1 is a diagram which shows a system configuration of a communication system 1 according to one embodiment of the present invention. The communication system 1 is configured to include a UE 10, eNBs 20 (an eNB 20A to an eNB 20F), a mobility management entity (MME) 30 (communication control device), an HSS 40, a DNS 50, an SGW-C 60 which is a first serving gateway, an SGW-U 70 (SGW-U 70A, SGW-U 70B) which is a second serving gateway, a PGW-C 80, and a PGW-U 90. An identifier is set in the eNB 20A to the eNB 20F, respectively. The identifier of the eNB 20A is "eNB1", the identifier of an eNB 20B is "eNB2", the identifier of an eNB 20C is "eNB3", the identifier of an eNB 20D is "eNB4", the identifier of an eNB 20E is "eNB5", and the identifier of the eNB 20F is "eNB6". Moreover, an identifier is set in the SGW-C 60. The identifier of the SGW-C 60 in FIG. 1 is "SGW-C1". In addition, identifiers are also set in the SGW-U 70A and the SGW-U 70B. The identifier of the SGW-U 70 is "SGW-U 1A", and the identifier of the SGW-U 70B is "SGW-U 1B".

The user equipment (UE) 10 (terminal) including a smart phone and a tablet terminal can perform communication by being connected to the communication system 1. In addition, the UE 10 stores information indicating a plurality of communication services usable by the UE 10, and transmits the information to the eNB 20. The communication service is a service using communication, and is a service such as video distribution and inter-vehicle communication. In each service, required network requirements are different. The UE 10 stores, as information indicating a communication service, a service type which is information indicating the network requirements.

The eNB 20 is a radio base station connected to the MME 30, and is a device having a radio access control function. The eNB 20 has a reception control function in a case where there is a call from the UE 10 and a paging function to call the UE 10 in a case where there is an incoming call from another UE 10 to the UE 10 as a basic function. In addition, the eNB 20 stores an address of the MME 30, and makes a handover request to the address in a case where a handover request is received from the UE 10.

The MME 30 is a device which is connected to the UE 10 via the eNB 20 in a case where there is an attach request (location registration request) from the UE 10. Here, the MME is a part that performs location management of the UE 10 located in a long-term evolution (LTE) network, authentication control, and a process of setting a communication path of user data between the SGW 80 and the eNB 20.

In addition, the MME 30 performs a path setting process for control data with respect to the SGW-C 60 determined by a process to be described below. In addition, the MME 30 acquires an address of the SGW-C 60 corresponding to a service type acquired from the eNB 20 from the DNS 50, and connects to the acquired address.

The DNS 50 is a computer which manages a correspondence relationship among a domain name, a host name, and an IP address on the network. Furthermore, the DNS 50 stores information in which the service type, the identifier of the SGW-C 60 or the SGW-U 70, and the address (connection destination information) of the SGW-C 60 or the SGW-U 70 are associated with one another.

In a case where the identifier of the SGW-C 60 or the SGW-U 70 is received from the MME 30 and an address transmission request is received, the DNS 50 identifies an address corresponding to the received identifier from the information and transmits the identified address to the MME 30.

The SGW-C 60 transmits or receives a control signal using a control plane which is a path for transmitting the control signal used for providing a communication service used by the UE 10 between the SGW-C 60 and a packet data network gateway (PGW) in a servicing packet switch accommodating LTE. A plurality of SGW-Cs 60 may be provided corresponding to requirements of the plurality of communication services.

The SGW-U 70 transmits or receives a user data signal using a user plane which is a path for transmitting the user data signal used for providing the communication service used by the UE 10 between the SGW-U 70 and the PGW in the servicing packet switch accommodating LTE. A plurality of SGW-Us 70 may be provided corresponding to the requirements of the plurality of communication services.

The PGW-C 80 is a junction with a pocket data network (PDN), and a gateway which performs allocation of an IP address, packet transfer to the SGW-C 60, and the like. That is, the PGW-C 80 transmits or receives a control signal to or from the SGW-C 60 by connecting with the SGW-C 60. A plurality of PGW-Cs 80 may also be provided corresponding to the requirements of the plurality of communication services.

The PGW-U 90 is a junction with the PDN, and is a gateway which performs allocation of an IP address and packet transfer to the SGW-U 70. That is, the PGW-U 90 transmits or receives a user data signal to or from the SGW-C 70 by connecting to the SGW-U 70. A plurality of PGW-Us 90 may also be provided corresponding to the requirements of the plurality of communication services.

In the communication system 1, the plurality of eNBs 20 are associated with a single SGW-U 70, and the plurality of SGW-Us 70 are associated with one SGW-C 60. In addition, the eNBs 20 belonging to the same service area (an area managed by the SGW-U 70) are linked to different SGW-Us 70 in some cases.

Next, the configuration elements of the MME 30 having features in the communication system 1 will be described with reference to FIG. 2.

Figure 2:
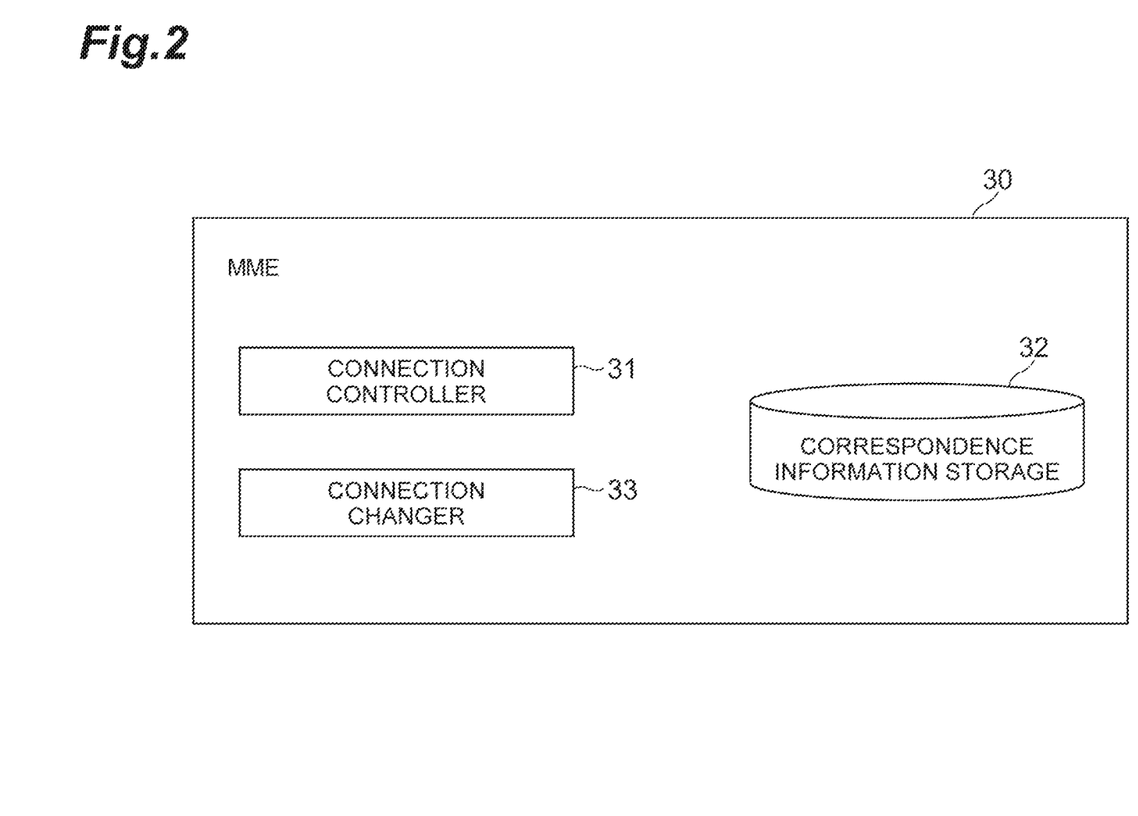
FIG. 2 is a diagram which shows a functional block of a device which is part of the communication system according to an embodiment of the present invention.

As shown in FIG. 2, the MME 30 is configured to include a connection controller 31, a correspondence information storage 32, and a connection changer 33.

Figure 3:
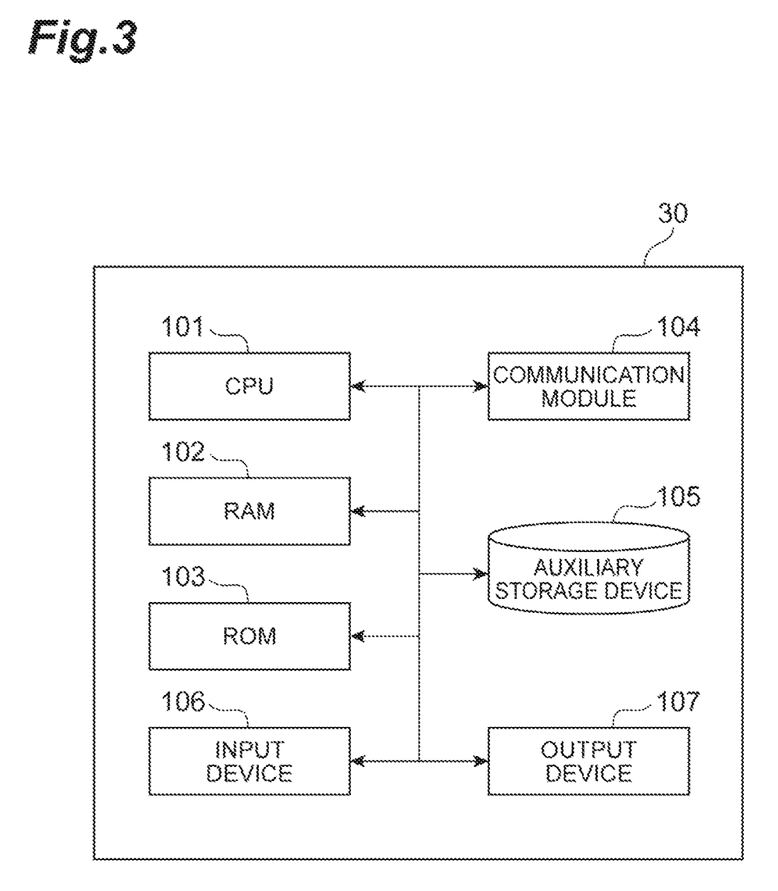
FIG. 3 is a diagram which describes a hardware configuration of the communication system.

In addition, as respectively shown in FIG. 3, the MME 30 is physically configured as a computer system which includes one or a plurality of CPUs 101, a RAM 102 and a ROM 103 which are main storage devices, a communication module 104 (transmitter or receiver) which is a data transmission/reception device, a hard disk, an auxiliary storage device 105 (memory) exemplified as a flash memory and the like, an input device 106 exemplified as a touch panel, a keyboard, and the like which are input devices, an output device 107 such as a display, and the like. In the MME 30, predetermined computer software is read on hardware such as the CPU 101 and the RAM 102 shown in FIG. 3, and thereby the communication module 104, the input device 106, and the output device 107 are operated under the control of the CPU 101, and data are read or written in the RAM 102 and the auxiliary storage device 105, and thereby a series of functions in each device is realized.

Instead of executing each function in FIG. 2 by a processor such as the CPU 101, each function may be configured to be executed by constructing a dedicated integrated circuit (IC) for executing all or a part of the functions. For example, the functions described above may be executed by constructing a dedicated integrated circuit for performing image processing and communication control.

The software is called software, firmware, middleware, a microcode, or a hardware description language, and, regardless of whether it is called another name, the software can be widely interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

In addition, software, instructions, and the like may be transmitted or received via a transmission medium. For example, in cases where software is transmitted from a website, a server, or other remote sources using a wired technology such as a coaxial cable, a fiber optic cable, a twisted pair, and a digital subscriber line (DSL), and/or a radio technology such as infrared, radio, and microwaves, these wired and/or radio technologies are included in a definition of the transmission medium.

The connection controller 31 is a portion that performs control of connection to each type of device. Identifically, the connection controller 31 receives a handover request from the eNB 20 and identifies a target eNB 20 due to the handover request and a source eNB 20. In addition, the connection controller 31 sends a response to the handover request to the eNB 20.

The connection controller 31 receives the handover request from the eNB 20 and acquires the identifier of the source eNB 20 due to the handover request and the identifier of the target eNB 20 due to the handover, thereby identifying the target eNB 20 due to the handover request and the source eNB 20.

The connection controller 31 sends out the target eNB 20 and the source eNB 20 which are identified to the connection changer 33.

The correspondence information storage 32 is a portion which acquires correspondence information in which the eNB 20, the SGW-C 60 that transmits or receives a control signal using a control plane which is a path for transmitting the control signal for a communication service used by the UE 10, and the SGW-U 70 that transmits or receives a user data signal using a user plane which is a path for transmitting the user data signal for the communication service are associated with one another in advance, and stores the correspondence information.

Figure 4:
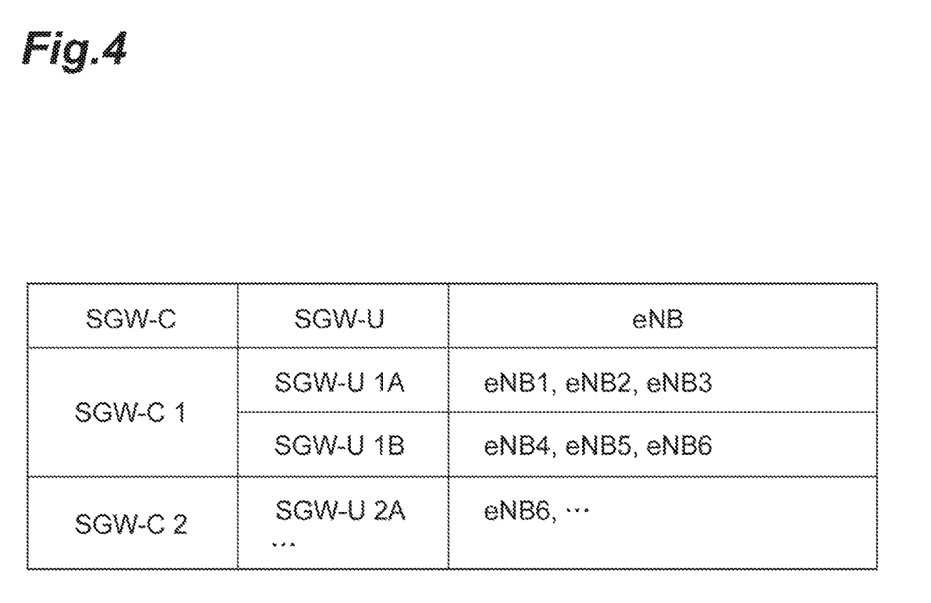
FIG. 4 is a diagram which shows a data structure of correspondence information.

Here, FIG. 4 shows an example of the correspondence information. As shown in FIG. 4, "SGW-C" indicating the identifier of the SGW-C 60, "SGW-U" indicating the identifier of the SGW-U 70, and "eNB" indicating the identifier of the eNB 20 are associated with one another and stored.

The connection changer 33 is a portion which determines whether or not it is necessary to change the SGW-C 60 and the SGW-U 70 due to the change of the eNB 20 caused by the handover, and controls a change request for the SGW-C 60 and the SGW-U 70 on the basis of this determination.

The connection changer 33 identifies the SGW-C 60 and the SGW-U 70 associated with the target eNB 20, and the SGW-C 60 and the SGW-U 70 associated with the source eNB 20 with reference to the correspondence information stored in the correspondence information storage 32.

Subsequently, the connection changer 33 compares the SGW-C 60 associated with the target eNB 20 with the SGW-C 60 associated with the source eNB 20, and determines whether or not an SGW-C 60 is to be changed. In addition, the connection changer 33 compares the SGW-U 70 associated with the target eNB 20 with the SGW-U 70 associated with the source eNB 20, and determines whether or not an SGW-U 70 is to be changed.

Subsequently, the connection changer 33 controls the change requests for at least one of the SGW-C 60 and the SGW-U 70 on the basis of a result of the determination. Identifically, in cases where the SGW-C 60 is changed and the SGW-U 70 is changed, the connection changer 33 transmits the identifier of the target SGW-C 60 and the identifier of the target SGW-U 70 to the DNS 50, acquires an address corresponding to the identifier of the target SGW-C 60 and an address corresponding to the identifier of the target SGW-U 70, makes a connection request to the target SGW-C 60, notifies the address of the target SGW-U 70, and makes a connection request to the SGW-U 70.

In a case where the SGW-C 60 is not changed but the SGW-U 70 is changed, the connection changer 33 transmits the identifier of the target SGW-U 70 to the DNS 50 and acquires the address corresponding to the identifier of the target SGW-U 70. Then, the connection changer 33 notifies the SGW-C 60 of the address of the target SGW-U 70 and makes a connection request to the SGW-U 70. In this manner, the connection changer 33 makes a change request only for the SGW-U 70 in the case where the SGW-C 60 is not changed but the SGW-U 70 is changed according to a result of the determination. In addition, the connection changer 33 acquires the address of the SGW-U 70 from the DNS 50, notifies the address of the target SGW-U 70, and makes a connection request to the SGW-U 70.

In addition, the connection changer 33 does not issue a connection request to the SGW-C 60 in a case where neither the SGW-C 60 nor the SGW-U 70 is changed.

Moreover, the connection changer 33 communicates with the SGW-C 60 such as making a bearer change request to the SGW-C 60 or receiving a response to the bearer change request from the SGW-C 60.

Figure 5:
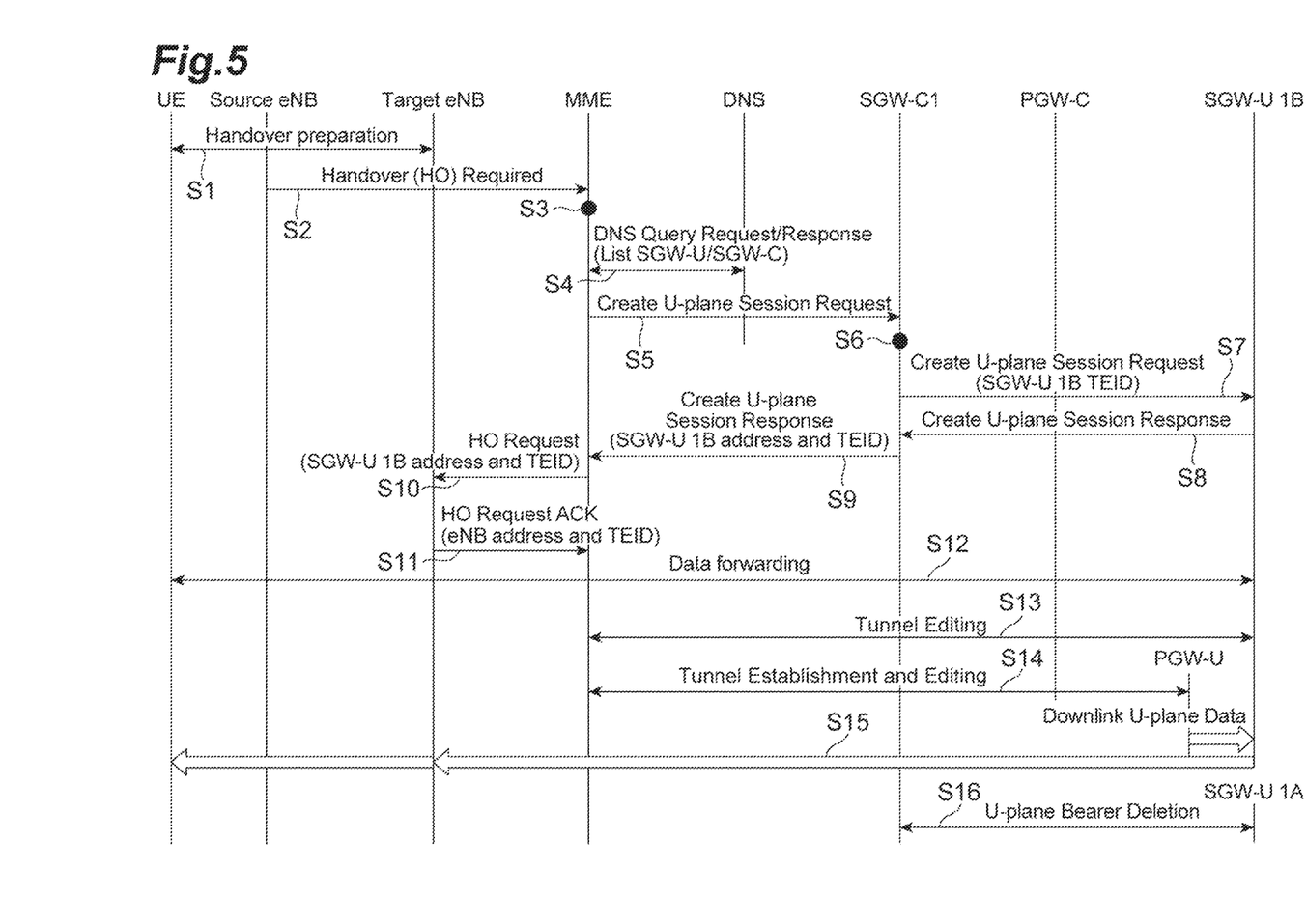
FIG. 5 is a sequence diagram which shows a process of changing SGW-U 70 in accordance with a handover.
Figure 6:
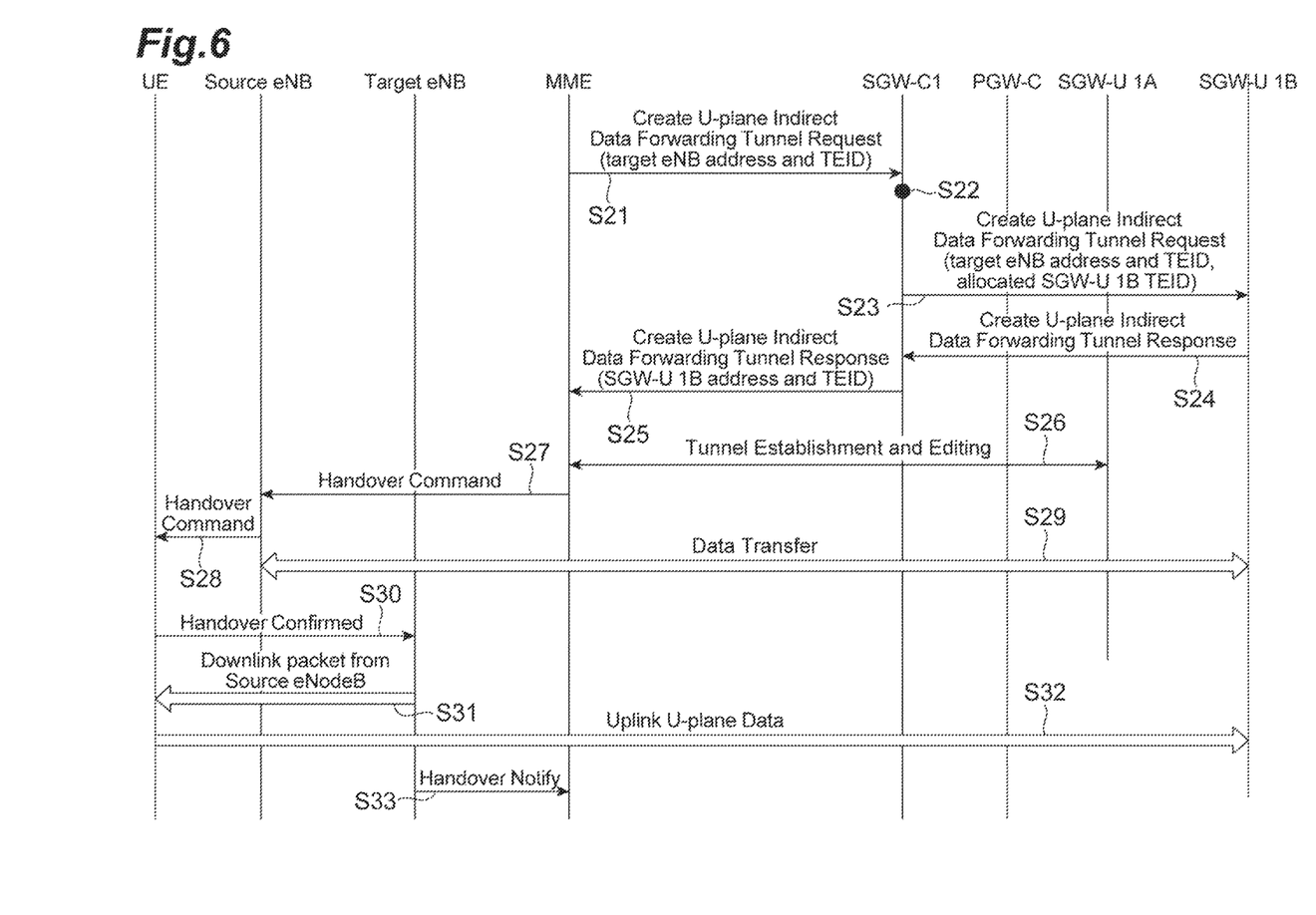
FIG. 6 is a sequence diagram which shows a data forwarding process.

Next, a gateway change method in the communication system 1 described above will be described using FIGS. 5 and 6. FIG. 5 is a sequence diagram which shows an entire process of changing the SGW-U 70 in accordance with a handover. FIG. 6 is a sequence diagram which shows a data forwarding (data transfer) process of step 12 among the processes shown in FIG. 5.

First, a process to change the SGW-U 70 is described with reference to FIG. 5. As a premise, the source eNB 20 due to the handover is set to a source eNB (for example, an eNB 20C). In addition, the target eNB 20 is set to a target eNB (for example, an eNB 20D). The identifier of the SGW-U 70 corresponding to the source eNB 20 due to the handover is "SGW-U 1A", and the identifier of the SGW-U 70 corresponding to the target eNB 20 due to the handover is "SGW-U 1B". In addition, the MME 30 stores the correspondence information in the correspondence information storage 32 in advance (acquisition step).

First, the UE 10 periodically measures parameters such as a radio wave intensity and belongs to an eNB 20 with the best quality. In a case where there is another eNB (target eNB) 20 better than the source eNB 20, the UE 10 makes a handover request for information (for example, the identifier of the target eNB 20) on the target eNB 20 to the source eNB 20 (step S1: Handover preparation).

The target eNB 20 sends the information on the target eNB 20 and the source eNB 20 to the MME 30 and makes a handover request, and the connection controller 31 receives the handover request from the eNB 20 and identifies the target eNB 20 due to the handover request and the source eNB 20 (step S2: HO request: request reception step).

The connection changer 33 determines whether or not it is necessary to change the SGW-C 60 and the SGW-U 70 according to the change of the eNB 20. The connection changer 33 determines to change only the SGW-U 70 as a result of the determination (step S3). Subsequently, the connection changer 33 transmits the identifier of the target SGW-U 70 to the DNS 50 and acquires the address of the SGW-U 70 (step S4: DNS Query Request/Response: gateway changing step).

The connection changer 33 requests the SGW-C 60 to establish a session with the target SGW-U 70 (SGW-U 1B) (step S5: Create U-plane session request: gateway changing step). In response to this, the SGW-C 60 creates a TEID for establishing a tunnel between the SGW-U 70 and the eNB 20 (step S6: Allocate SGW-U TEID for S1 int). Then, the SGW-C 60 sends the TEID of the target SGW-U 70 and the address of the target eNB 20 to be connected to the target SGW-U 70 (step S7: Create U-Plane Session request). The SGW-C 60 receives the session response from the target SGW-U 70 (step S8: Create U-plane session response). In addition, the SGW-C 60 transmits the TEID of the SGW-U 1B to the eNB 20 and the address of the SGW-U 70 which is a change target to be connected to the target eNB 20 via the MME 30 (step S9, S10).

The eNB 20 establishes a tunnel between the target eNB 20 and the target SGW-U 70 (step S11). Thereafter, data transfer is performed between the UE 10 and the SGW-U 70 (step S12). Subsequently, the tunnel between the target eNB 20 and the target SGW-U 70 is edited (step S13), and a tunnel between the target SGW-U 70 and the PGW-U 90 is established and edited (step S14). Subsequently, U-plane data are down-linked by the PGW-U 90 (step S15), and the U-plane bearer of the source SGW-U 70 is deleted (step S16).

Subsequently, using FIG. 6, the data transfer process in step S12 of FIG. 5 (Data forwarding process) will be described. First, the MME 30 makes a request for tunnel establishment between the source SGW-U 70 and the target SGW-U 70 (step S21: Create U-Plane indirect data forwarding tunnel request). Then, the SGW-C 60 creates a TEID for establishing a tunnel (step S22). The SGW-C 60 transmits the TEID to the SGW-U 70 (step S23: Create U-plane indirect data forwarding tunnel request). In addition, the SGW-U 70 notifies of reception of the TEID (step S24: Create U-plane indirect data forwarding tunnel response). The SGW-C 60 notifies the MME 30 that preparation of the target SGW-U 70 is finished (step S25: Create U-plane indirect data forwarding tunnel response). Subsequently, the TEID is also allocated to the source SGW-U 70 to prepare tunnel establishment (step S26). Next, the MME 30 requests the eNB 20 to establish a tunnel between the source eNB 20 and the source SGW-U 70 (step S27). Then, the eNB 20 performs a handover to the UE 10 (step S28). Subsequently, the eNB 20 performs data transfer to the target eNB 20 from the source eNB 20 (step S29). The UE 10 notifies ascertainment of the handover to the target eNB 20 (step S30). Subsequently, the target eNB 20 transfers data of the source eNB 20 transferred using the tunnel to a terminal (step S31). The UE 10 transfers data to the SGW-U 70 (step S32). Subsequently, UE 10 notifies the MME 30 that the handover between the UE 10 and the eNB 20 is over (step S33).

As described above, the correspondence information storage 32 acquires correspondence information in which the eNB 20, the SGW-C 60, and the SGW-U 70 are associated with one another in advance, and the connection controller 31 receives a handover request from the eNB 20 and identifies the target eNB 20 and the source eNB 20. The connection changer 33 identifies the SGW-C 60 and the SGW-U 70 associated with the target eNB 20 with reference to the correspondence information, and furthermore identifies the SGW-C 60 and the SGW-U 70 associated with the source eNB 20. In addition, the connection changer 33 determines whether or not the SGW-C 60 is to be changed and the SGW-U 70 is to be changed on the basis of the results of identification, and controls change requests for one of the SGW-C 60 and the SGW-U 70 on the basis of a result of the determination.

In this case, the MME 30 can appropriately determine whether or not it is necessary to perform a change process in contrast to a case in which the SGW-C 60 and the SGW-U 70 are uniformly changed in accordance with the change of the eNB 20.

Moreover, the connection changer 33 makes a change request only for the SGW-U 70 in a case where the SGW-C 60 is not changed but the SGW-U 70 is changed according to a result of the determination. In this case, since the MME 30 performs the change process on only the target SGW-U 70, it is possible to appropriately control the change request.

In addition, the connection changer 33 further acquires the address of the SGW-U 70 which is a change request target, transmits the address, and makes a change request for the SGW-U 70. In this case, the connection changer 33 acquires the address of the SGW-U 70 in advance and transmits the address at a time of making the change request, and thus it is possible to omit a process of acquiring the address from the DNS 50 at the SGW-C 60.

In the embodiment described above, a case in which the MME 30 acquires the address of the target SGW-U 70 from the DNS 50 has been described, but the SGW-C 60 may be made to acquire the address of the target SGW-U 70 from the DNS 50.

"Information" described in the present identification may be represented using any of a variety of different technologies. For example, data, instructions, commands, information, signals, bits, symbols, chips, and the like which may be mentioned throughout the entire description above may also be represented by voltages, currents, electromagnetic waves, magnetic fields or magnetic particles, optical fields or photons, or any combination thereof.

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like.

The phrase of "on the basis of" used in the present identification does not mean "based only on" as long as not explicitly stated. In other words, the phrase of "on the basis of" means both "based only on" and "based on at least".

The process procedures, sequences, flowcharts, and the like of each aspect/embodiment described in the present identification may be switched as long as there is no contradiction. For example, elements of various steps are presented in an exemplary order in the methods described in the present identification, but the methods are not limited to the presented identific order.

Each aspect/embodiment described in the present identification may be used alone, may be used in combination, and may also be used by being switched in accordance with execution. In addition, notification of predetermined information (for example, notification of "being X") is not only performed explicitly but also may be performed implicitly (for example, not notifying the predetermined information).

As described above, the present invention has been described in detail, but it will be obvious to those skilled in the art that the present invention is not limited to the embodiments described in the present identification. The present invention can be implemented as modifications and in different modes without departing from the spirit and scope of the present invention as defined by the scope of the claims. Accordingly, the description of the present identification is for the purpose of illustrative description, and does not have any restrictive meaning for the present invention.

Any reference to elements using names such as "first" and "second" used in the present identification does not generally limit the amount or the order of these elements. Instead, these names can be used in the present identification as a convenient method to distinguish two or more elements. Therefore, a reference to the first and second elements does not imply that only two elements can be adopted or that the first element needs to precede the second element by any means.

The terms described in the present identification and/or the terms necessary for understanding the present identification may be replaced with terms having the same or similar meanings.

The terms of "system" and "network" used in the present identification are interchangeably used.

In addition, the information, the parameters, and the like described in the present identification may be represented by an absolute value, may be represented by a relative value with respect to a predetermined value, or may also be represented by corresponding different information. For example, a radio resource may be indicated by an index.

To the extent that "include", "including", and modifications of these are used in the present identification or the claims, these terms are intended to be inclusive of the term "comprise". Furthermore, the term of "or" used in the present identification or the claims is intended not to be an exclusive OR.

Each aspect/embodiment described in the present identification may also be applied to long term evolution (LTE), LTE-advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark), a system using other appropriate systems, and/or a next-generation system expanded on the basis of these.

The input or output information and the like may be kept in a predetermined place (for example, a memory), and may also be managed in a management table. The input or output information and the like can be overwritten, updated, or added to. The output information and the like may also be deleted. The input information and the like may also be deleted. The input information and the like may also be transmitted to other devices.

In the entirety of the present disclosure, as long as there is no clear indication of being singular, both singular and plural are included.

REFERENCE SIGNS LIST

1: Communication system; 10: UE (terminal); 20: eNB (base station); 30: MME; 31: Connection controller, 32: Correspondence information storage; 33: Connection changer; 40: HSS; 50: DNS; 60: SGW-C; 70: SGW-U; 80: PGW-C; 90: PGW-U.

The invention claimed is:

1. A gateway change method of changing a serving gateway for a connection to a terminal in a communication system including the terminal, a plurality of base stations, a plurality of serving gateways, and a communication control device, the method comprising:
   an acquisition step of acquiring correspondence information in which (i) the base station, (ii) a first serving gateway that transmits or receives a control signal using a control plane which is a path for transmitting the control signal for a communication service used by the terminal, and (iii) a second serving gateway that transmits or receives a user data signal using a user plane which is a path for transmitting the user data signal for the communication service, are associated with each other;
   a request reception step of receiving a handover request and identifying a target base station and a source base station in the handover request; and
   a gateway change step of generating an identified result which identifies a first serving gateway and a second serving gateway associated with the target base station identified by the request reception step and a first serving gateway and a second serving gateway associated with the source base station identified by the request reception step, with reference to the correspondence information acquired in the acquisition step, making a determination on whether or not the first serving gateway is to be changed and the second serving gateway is to be changed on the basis of the generated identified result, and controlling change requests for at least one of the first serving gateway and the second serving gateway on the basis of a result of the determination.

2. The gateway change method according to claim 1, wherein, in the gateway change step, in a case where the first serving gateway is not changed but the second serving gateway is changed, a change request only for the second serving gateway is made according to a result of the determination.

3. The gateway change method according to claim 2, wherein, in the gateway change step, connection destination information indicating a connection destination of the second serving gateway which is a change request target is acquired, the connection destination information is transmitted, and a change request for the second serving gateway is made.

4. The gateway change method according to claim 1, wherein, in the gateway change step, connection destination information indicating a connection destination of the second serving gateway which is a change request target is acquired, the connection destination information is transmitted, and a change request for the second serving gateway is made.

* * * * *

UNITED STATES PATENT AND TRADEMARK OFFICE
CERTIFICATE OF CORRECTION

PATENT NO. : 10,278,102 B2
APPLICATION NO. : 15/554343
DATED : April 30, 2019
INVENTOR(S) : Takuya Shimojou et al.

It is certified that error appears in the above-identified patent and that said Letters Patent is hereby corrected as shown below:

On the Title Page

Item (30), the Foreign Application Priority Data has been omitted. Item (30) should read:
-- (30) Foreign Application Priority Data
Feb. 17, 2016 (JP) .................... 2016-028247 --

Signed and Sealed this
Nineteenth Day of November, 2019

Andrei Iancu
*Director of the United States Patent and Trademark Office*